Aug. 4, 1953

H. T. COATES 2,647,719

SELF-MEASURING MILK DISPENSER

Filed Dec. 14, 1951

INVENTOR
HENRY T. COATES.
BY
Cornelius Zalustie
ATTORNEY

Aug. 4, 1953    H. T. COATES    2,647,719
SELF-MEASURING MILK DISPENSER
Filed Dec. 14, 1951    2 Sheets-Sheet 2
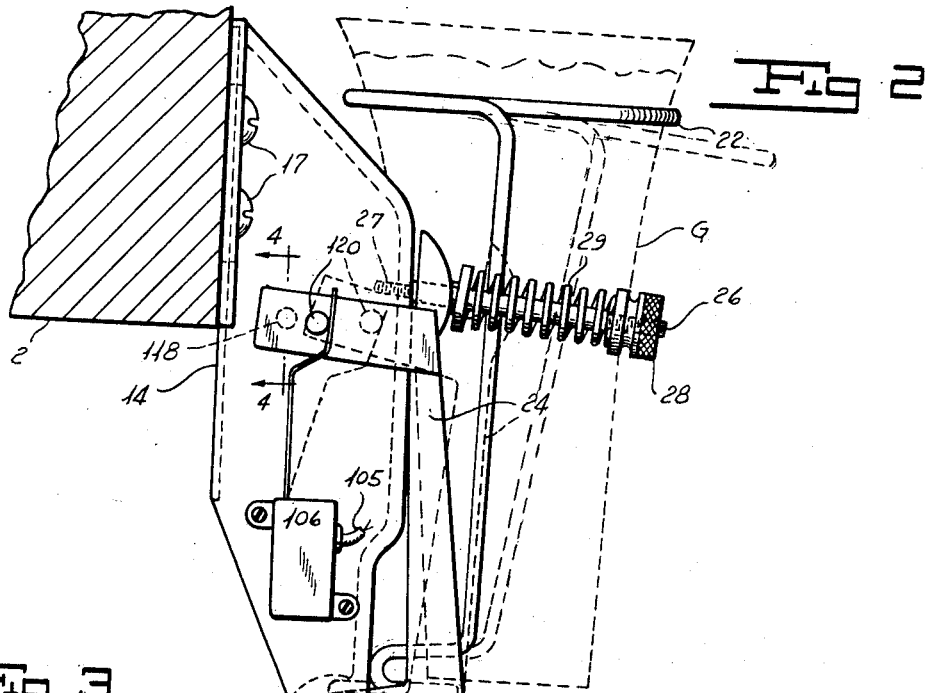
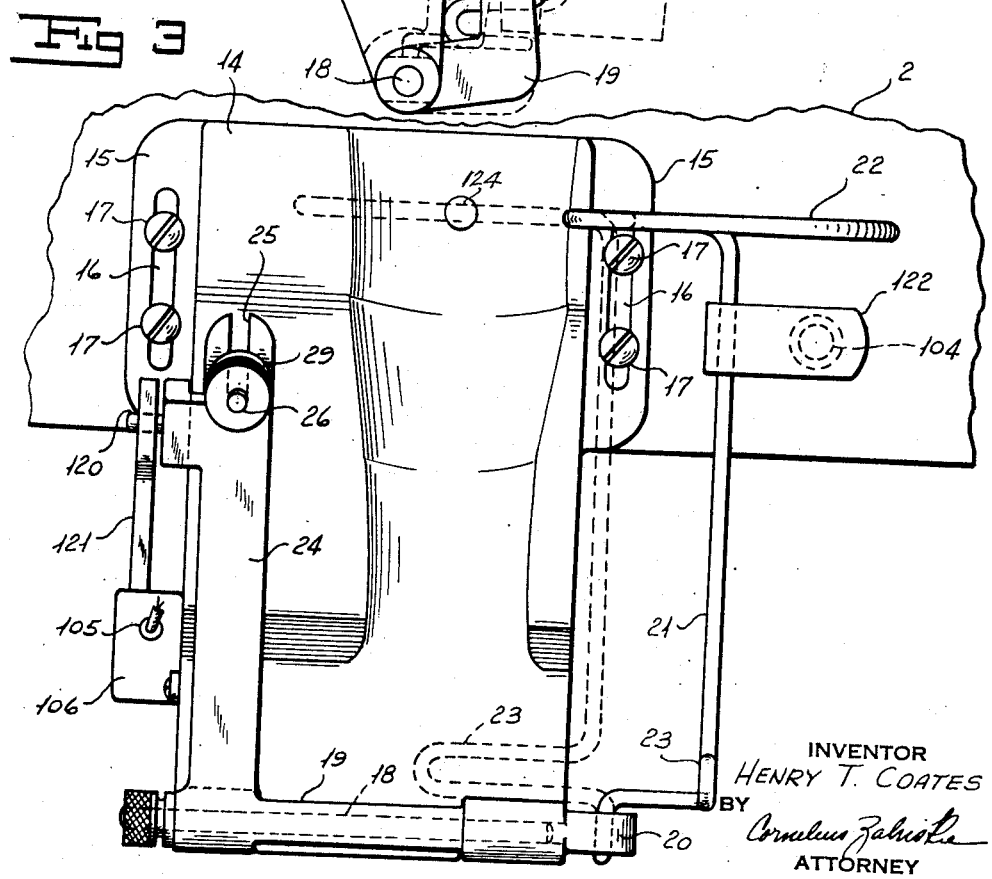
INVENTOR
HENRY T. COATES
BY
ATTORNEY Patented Aug. 4, 1953

2,647,719

UNITED STATES PATENT OFFICE 2,647,719

SELF-MEASURING MILK DISPENSER

Henry T. Coates, Clinton, N. J., assignor to Monitor Process Corporation, Jersey City, N. J., a corporation of New Jersey Application December 14, 1951, Serial No. 261,684

5 Claims. (Cl. 249—63)

1

This invention relates to apparatus for dispensing milk from a well known and conventional milk delivery can where contained in a dispensing cabinet and the object of the invention is to insure the uniform quantity of milk to be dispensed by the glassful at each operation, irrespective of the amount of the hydrostatic head of the milk in the can.

Attempts have been heretofore made to accomplish this result and the present invention is an improvement upon prior devices whereby more satisfactory and efficient operation is obtained with unfailing uniformity of results.

In accordance with the present invention, the milk is dispensed through a milk delivery tube extending through the side wall of the can and through the wall of a cabinet in which the can is normally maintained in refrigerated condition. The delivery tube is valved and the valve thereof is adapted to be controlled by valve operating mechanism mounted in the door of the cabinet. Heretofore that valve has been usually manually controlled. In accordance with the present invention, it is operated by a solenoid which is included in an electrical system, either manually or coin controlled or both, so that the solenoid may be actuated in a predetermined manner to open the valve and permit milk to flow until a predetermined quantity of milk is delivered into a glass. When such predetermined quantity has been delivered, the weight of the glass and contents serve, according to the present invention, to further control the electrical system to de-energize the solenoid and effect the closing of the valve so that the milk is shut off.

Features of the invention, other than those adverted to, will be apparent from the hereinafter detailed description and appended claims when read in conjunction with the accompanying drawings.

The accompanying drawings illustrate one practical embodiment of the invention, but the construction therein shown is to be understood as illustrative, only, and not as defining the limits of the invention.

Figure 2 is a fragmental view showing the mechanism for supporting the glass in a position to receive the milk to be dispensed and for operating certain adjuncts of the electrical system.

Figure 3 is a front elevation of the structure shown in Figure 2.

2

Figure 4:
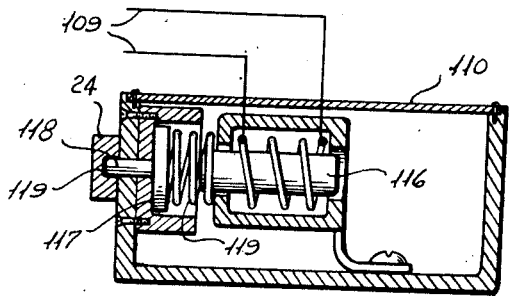

Figure 4 is a section on the line 4—4 of Figure 2.

Figure 1:
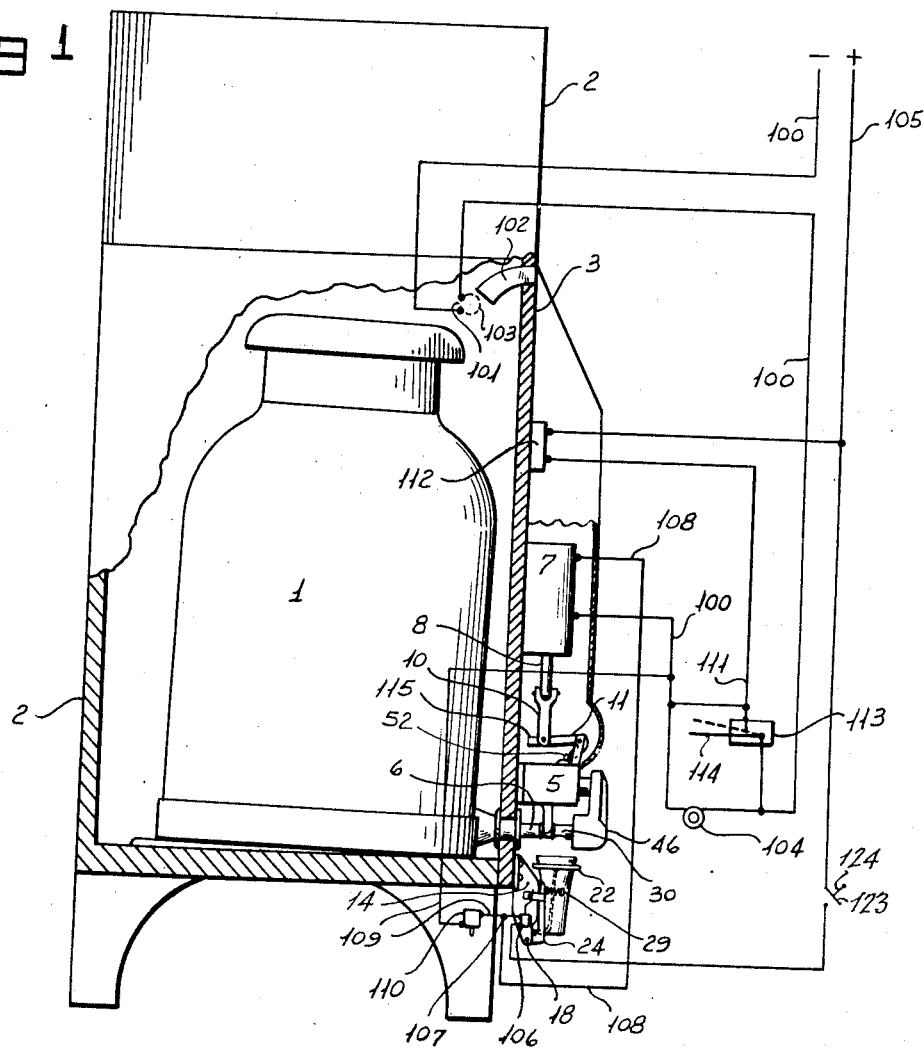
Figure 1 shows a milk dispensing cabinet with a portion of the wall and door broken away to better show the milk dispensing apparatus of the present invention and its associated wiring.

In Figure 1 of the drawings I have shown a conventional milk delivery can 1 positioned within a cabinet 2 with a hinged door 3. The can 1 is of the side delivery type illustrated in William Tamminga Patent No. 2,186,083, of January 9, 1950, and, as such, is provided with a discharge tube 6 projecting through an opening in the door 3 for cooperation with valve control means 5 mounted on the door 3. The valve control means includes an operating lever 52 which, when, operated, acts upon an operating arm 46 to move a slide valve, positioned in the discharge tube, to unseal a discharge port 30 in the tube, so that milk may flow from the can. Mounted on the door 3 above the valve control mechanism 5 is a solenoid 7 having a plunger 8 and this plunger is connected by a link 10 to a bell crank 11 which in turn is connected to the operating lever 52. When the solenoid is energized and its plunger 8 elevated, the slide valve will be operated to permit milk to flow from the port 30.

Positioned below the valve control means 5 and also mounted on the door 3 is a mount 14 which may conveniently be in the form of a casting with laterally extending wings 15 vertically slotted at 16 as shown in Figure 3. Screws 17 are passed through the slots and threaded into the door to adjustably secure the mount thereto. The purpose of this adjustment is to arrange for glasses of different height or diameter, for it is desirable that the glass G be fairly close to the port 30.

The mount 14, as shown in Figure 3, carries, near its lower extremity, a transverse pin 18 and on this pin is supported a pivoted bracket 19. One end of this bracket has a laterally extending lug 20 with a vertical perforation to receive the lower end of a glass holder 21 in the form of a wire frame. The upper end of the frame has a circular coil 22 to receive and support a glass G, while the lower end of the frame projects into the hole in the lug 20 so that the frame may be swung from the dotted line position of Figure 3 to the full line position thereof and vice versa. The frame is also provided with an offset 23 which acts as a stop to engage the mount 14 as the glass is swung into position to receive milk from the port 30 and thus properly locate the glass below the port.

The bracket 19 is provided at its other lateral edge with an upstanding arm 24, the upper end of which is bifurcated at 25. Through this bifurcation extends an adjusting stud 26, one end of which is threaded into the mount, as shown at 27 in Figure 2, while the other end is threaded to receive an adjusting nut 28. A coil spring 29 encircles the stud and by regulating the nut 28, the spring 29 may be placed under the compression desired to yield as the milk flows into the glass and thus permit tilting of the bracket. When the glass has received a predetermined quantity of milk and the bracket has been correspondingly tilted, the valve will be shut off as presently explained. It will thus appear that the amount of milk to be dispensed at any one operation may be controlled by regulation of the nut 28 and, since the operation of the spring will not vary for long periods of time and operation, it will be apparent that a uniform quantity of milk will be dispensed throughout such period.

In order to accomplish the results which I have described, it is of course necessary to electrically energize the solenoid to initiate the flow of milk and to subsequently de-energize the solenoid after a predetermined quantity of milk has been dispensed.

In the construction shown the energizing of the solenoid 7 will elevate the plunger and open the valve while a spring (indicated at 55 in Tamminga Patent No. 2,186,083) will return the parts to initial condition and close the valve when the solenoid is de-energized. These operations are carried out by the electrical system which will next be described. While the system may be either wholly coin controlled or wholly manually controlled or jointly coin and manually controlled, the drawings illustrate the latter arrangement.

By reference to Figure 1, current is fed from appropriate mains through a negative lead 100 to a coin controlled switch 101 which may be of any conventional character such, for example, as illustrated in my copending application, Serial No. 209,767, filed February 7, 1951, now abandoned. In Figure 1, the coin slot is shown at 102 and the coin at 103. From the coin switch 101, the lead 100 extends to a normally open push button switch 104 and from thence to one terminal of 7. A positive lead 105 extends from a suitable source to a normally closed master switch 106 of the microtype and emerges therefrom to connect at a junction point 107 with two separate electrical leads 108 and 109. The lead 108 connects with the other terminal of the solenoid while the lead 109 connects with the lead 100 between the push button 104 and the solenoid terminal and this lead 109 includes a magnetically operated detent 110 of the type shown in Figure 4.

It will also be noted that the lead 100 is connected between the push button and the solenoid with a wire 111 including a momentary impulse counter 112 and extending to the positive lead 105. A normally open microtype switch 113 is connected across the lead 100 and the wire 111 in a manner to shunt the push button switch. This microswitch has an operating arm 114 which, in practice at all times lies above a projection 115 of the bell crank lever 11. When the solenoid is energized and the bell crank lifted to open the valve, the normally open microswitch 113 will be closed and will remain closed as long as the solenoid is energized and its plunger elevated.

The magnetically operated detent 110 is shown in section in Figure 4. It includes an appropriate casing in which is positioned an electromagnet having a fixed core 116. This magnet has an armature 117 which carries a detent pin 118 urged by a spring 119 to normally extend through and beyond a perforation in the end of the casing 110. This pin is so located that, when the arm 24 of the glass holding bracket is in idle retracted position, the pin 118 will project into a socket 119 in the inner side of the arm 24, as clearly shown in Figure 4, so as to lock the arm and bracket in the retracted position shown in full lines in Figure 2. If a glass G is placed in the holder 21, it will have no effect whatsoever upon the apparatus because the detent pin 118 normally locks the parts in inoperative condition.

This condition will persist until a coin is deposited in the machine and the push button pressed. The deposit of the coin will complete the lead 100 at the coin switch, but the circuit will not be completed to the solenoid until the push button 104 is pressed. When this is done, current flows through the lead 100 to the solenoid and returns to source through the lead 105, through the lead 108 and normally closed switch 106. As soon as the solenoid 7 is energized, the valve is opened and milk will flow into the glass G supported in the holder beneath the port 30.

Simultaneously with the feed of current through the solenoid, current will flow through the circuit 109 to energize the detent control magnet 116 so that the detent pin 118 will be withdrawn and the glass holding bracket will be permitted to tilt in opposition to the action of the spring 29. Moreover, as soon as the push button is pressed and the solenoid elevated, such elevation will cause the projection 115 to act upon the operating arm 114 of the normally open microswitch 113 and, as a result, the push button will be shunted so that, even though the operator's finger is removed from the button, current will continue to flow through the solenoid and through the counter 112 back to source.

These conditions will persist and the milk will continue to flow until a predetermined quantity of milk has been deposited in a glass. At that time, a pin 120 on the arm 24 will move the operating arm 121 of the normally closed microswitch 106 into a position to break the circuit at this point. As a result, the solenoid will be de-energized, the milk outlet port will be sealed, and the microswitch 113 will automatically open. The purchaser may then swing the filled glass from beneath the valve operating mechanism and lift it from the machine. In so doing the holder 21 will be moved from the dotted line position of Figure 3 to the full line position thereof and a protecting shield 122 on the holder moved into a position over the push button so that the push button will not again be pushed until the next glass has been inserted into the holder and moved into a position to receive milk from the port 30.

In addition to or as a substitute for the shield 122 the circuit 105 may have therein a normally open switch 123 adapted to be closed by engagement of the glass holder ring 22 with a tail 124 of this switch, when the glass holder is swung to bring the glass into position to receive milk. The switch 123 should be normally held open by a suitable spring so that, when the glass is moved out of milk receiving position, this switch will automatically open and preclude operation of the parts until the glass is again in milk receiving position.

As soon as the glass has been removed from the holder by the purchaser, the spring 29 will return the bracket 19 and its arm 24 into normally inactive position shown in full lines in Figure 2 and, as the arm swings back into place, the free end of the arm will have a camming effect upon the detent pin 118 causing it to be momentarily retracted until the pin is alined with the socket 119 and the re-locking of the arm is accomplished. In the meantime the coin switch has been tripped to release the coin in any suitable manner as, for example, in my copending application, above identified, so that the parts of the machine are left ready to dispense the next glass of milk.

It will be noted from the foregoing description that the structure which I have described is relatively simple and positive in its operation. In fact it is simple and more positive than the arrangement described in my copending application and is therefore very desirable from a commercial standpoint.

The foregoing detailed description sets forth the invention in its preferred practical form but the invention is to be understood as fully commensurate with the appended claims.

Having thus fully described the invention, what I claim as new and desire to secure by Letters Patent is:

1. An apparatus for dispersing a given quantity of milk through a valve, comprising a valve operating solenoid, an electric circuit for energizing the solenoid to open the valve, said circuit including the solenoid, a push button and a normally closed master switch, a maintaining circuit shunting the push button and including a normally open maintaining switch, means for closing the maintaining switch when the solenoid is energized to keep the solenoid energized until the master switch is opened, a pivoted glass holder having means to open the master switch when tilted to a predetermined angle, and a spring opposing the tilting of the holder to such angle until a predetermined quantity of milk has been deposited in the glass.

2. Apparatus as claimed in claim 1, including a detent for locking the holder against pivotal movement until the solenoid is energized.

3. Apparatus according to claim 1, wherein a coin operated switch is included in circuit with the solenoid.

4. An apparatus for dispensing a given quantity of milk through a valve comprising: a solenoid for operating the valve, a solenoid controlling circuit including a push button and a master switch, a shunt circuit across the push button including a shunting switch with means to close the shunting switch when the solenoid is energized, a pivoted glass holder for supporting a glass in retracted position to receive the milk, a detent for normally locking the glass holder in retracted position, a magnet included in circuit with the solenoid and simultaneously energized therewith to retract the detent when the solenoid is energized, resilient means biasing the glass holder against the weight of the milk and glass, and operative connections between the glass holder and the master switch to open said switch and de-energize the solenoid when the glass is tilted to a predetermined maximum.

5. Apparatus as claimed in claim 1, wherein the resilient means comprises a spring adjustable by a regulating nut to control the amount of milk required to break the circuit.

HENRY T. COATES.

References Cited in the file of this patent

UNITED STATES PATENTS

| Number | Name | Date |
| --- | --- | --- |
| 2,037,688 | Brady | Apr. 14, 1936 |